(12) United States Patent
Nomura et al.

(10) Patent No.: US 7,068,410 B2
(45) Date of Patent: Jun. 27, 2006

(54) OPTICAL SCANNING APPARATUS AND IMAGE FORMING APPARATUS

(75) Inventors: Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/014,259

(22) Filed: Dec. 15, 2004

(65) Prior Publication Data

US 2005/0168788 A1 Aug. 4, 2005

(30) Foreign Application Priority Data

Dec. 26, 2003 (JP) .............................. 2003-431957

(51) Int. Cl.
*G02B 26/08* (2006.01)
(52) U.S. Cl. ...................... 359/225; 359/196; 359/197; 359/198; 359/212; 359/224; 347/231
(58) Field of Classification Search ................ 359/196, 359/198, 205, 212, 214, 219, 871, 224, 225; 347/231
See application file for complete search history.

(56) References Cited

U.S. PATENT DOCUMENTS 5,010,353 A 4/1991 Murakashi et al.

| 6,384,949 | B1* | 5/2002 | Suzuki ...................... 359/196 |
| 6,388,792 | B1* | 5/2002 | Atsuumi et al. ............ 359/207 |
| 6,657,765 | B1* | 12/2003 | Hayashi et al. ............. 359/225 |
| 2002/0163704 | A1 | 11/2002 | Hayashi et al. | |

FOREIGN PATENT DOCUMENTS

JP 63-279220 11/1988

* cited by examiner

*Primary Examiner*—Euncha P. Cherry
*Assistant Examiner*—Pranav Khatri
(74) *Attorney, Agent, or Firm*—Hogan & Hartson LLP

(57) ABSTRACT

A light beam L from a laser source 62 impinges upon a deflection mirror surface 651 from the direction of a pivot axis (sub scanning direction Y) at an acute angle γ with respect to the surface normal NL to the deflection mirror surface 651, and the light beam scans in a main scanning direction X. Since the light beam is incident upon the deflection mirror surface 651 along the direction of the pivot axis, the length of a movable plate 653 in the main scanning direction X may be relatively short. Further, a first optical system 63 shapes the light beam incident upon the deflection mirror surface 651 into an elongated cross sectional shape which is long in the main scanning direction X, and the movable member 653 is finished as an elongated strip which elongates in the main scanning direction X. Hence, the movable plate 653 is light-weight and can pivot stably at a faster speed than in a conventional apparatus.

2 Claims, 8 Drawing Sheets

F I G. 1
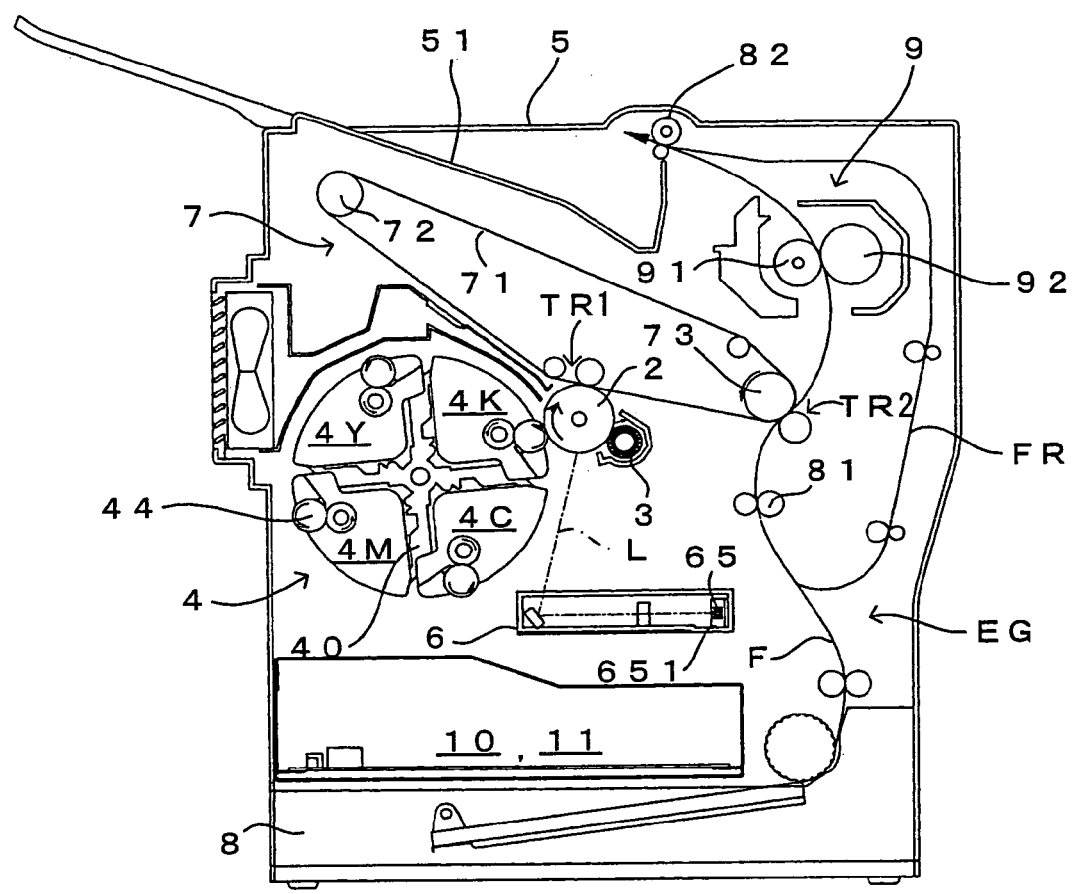

OPTICAL SCANNING APPARATUS AND IMAGE FORMING APPARATUS

CROSS REFERENCE TO RELATED APPLICATION

The disclosure of Japanese Patent Application No. 2003-431957 filed Dec. 26, 2003 including specification, drawings and claims is incorporated herein by reference in its entirety.

BACKGROUND OF THE INVENTION

1. Field of the Invention

The present invention relates to an optical scanning apparatus which makes a light beam scan on a surface-to-be-scanned in a main scanning direction and an image forming apparatus which forms an electrostatic image using such an optical scanning apparatus.

2. Description of the Related Art

An apparatus which uses this type of optical scanning apparatus is an image forming apparatus such as a laser printer, a copier machine and a facsimile machine. For instance, in the apparatus described in Japanese Patent Application Laid-Open Gazette No. 63-279220, a laser beam modulated in accordance with image data impinges upon a deflector via a collimator lens, a first cylindrical lens and a reflection mirror and is hence deflected. More specifically, the specific structure of the apparatus described in the Japanese Patent Application Laid-Open Gazette No. 63-279220 is as follows.

In this optical scanning apparatus, a laser beam emitted from a semiconductor laser passes through a collimator lens and a cylindrical lens, and the laser beam is accordingly shaped into such a laser beam whose cross sectional shape is a sideways-elongated elliptic shape which elongates in the main scanning direction. This laser beam impinges upon a reflecting mirror of a deflector along a main scanning surface.

To solve various problems which accompany use of a polygon mirror or a galvanometer mirror as a deflector, this apparatus uses a deflector which is manufactured utilizing a micro machining technique. In short, utilizing a photolithographic technique, an etching technique, etc., a substrate of crystal, glass, silicon or the like is processed into an optical deflection element in which a drive coil, a reflecting mirror and a ligament are formed integral with a frame. The deflector comprising this optical deflection element deflects a laser beam which is incident upon the reflecting mirror, as a voltage is applied upon the drive coil and the reflecting mirror can consequently pivot about a pivot axis which is approximately orthogonal to the main scanning direction.

The laser beam deflected by the deflector is imaged on an image forming member (which corresponds to the "latent image carrier" of the present invention) via a scanning lens and a second cylindrical lens. An electrostatic latent image which corresponds to image data is formed on the image forming member in this manner.

SUMMARY OF THE INVENTION

By the way, for optical scanning at a high speed in an optical scanning apparatus which uses a deflector manufactured utilizing a micro machining technique, it is necessary to increase the speed at which the reflecting mirror pivots. Weight reduction of the reflecting mirror which corresponds to the "movable member" of the present invention is important to meet this demand. However, in the case of the apparatus described in Japanese Patent Application Laid-Open Gazette No. 63-279220, the reflecting mirror needs be designed so that the reflecting mirror is sufficiently longer than the diameter of a laser beam on the reflecting mirror along the main scanning direction. In short, since the laser beam impinges upon the reflecting mirror along a main scanning surface in the structure of the conventional apparatus, even when a pivot angle θ of the reflecting mirror is zero, the laser beam impinges at an angle within the main scanning surface with respect to the normal line of the reflecting mirror. At this stage, the reflecting mirror slices the laser beam diagonally, and therefore, a larger reflecting surface than the beam diameter in the main scanning direction is necessary in order to reflect the entire beam. Further, considering that the angle at which the reflecting mirror slices the laser beam becomes more acute when the reflecting mirror pivots along a direction in which the angle of incidence of the laser beam increases, an even larger reflecting surface would be necessary. This is one of major obstacles against endeavors toward a higher speed.

The longer length of the reflecting mirror in the main scanning direction gives rise not only to a problem that the reflecting mirror becomes heavier but also to a problem that the moment of inertia of the reflecting mirror driven to pivot about a pivot axis increases. This is another obstacle against high-speed pivoting of the reflecting mirror.

The present invention has been made in light of the problems described above, and accordingly, an object of the present invention is to provide an optical scanning apparatus which makes a light beam scan on a surface-to-be-scanned at a high speed and an image forming apparatus which uses such an optical scanning apparatus.

According to a first aspect of the present invention, there is provided an optical scanning apparatus which makes a light beam scan on a surface-to-be-scanned in a main scanning direction, comprising: a deflector in which a movable member, which includes a deflection mirror surface which is shaped like an elongated strip which elongates in the main scanning direction, is integrated with a support member which supports the movable member in such a manner that the movable member can freely pivot about a pivot axis which is approximately orthogonal to the main scanning direction, the deflector driving the movable member to pivot about the pivot axis, thereby deflecting the light beam which is incident upon the deflection mirror surface; a light source emitting the light beam; a first optical system which shapes the light beam from the light source into an elongated cross sectional shape which elongates in the main scanning direction, and makes the light beam impinge upon the deflection mirror surface from a front side to the deflection mirror surface along a direction of the pivot axis at an acute angle with respect to a surface normal to the deflection mirror surface; and a second optical system which images the light beam deflected by the deflection mirror surface on the surface-to-be-scanned.

According to a second aspect of the present invention, there is provided an image forming apparatus, comprising: a latent image carrier, and an optical scanning apparatus which makes a light beam scan on a surface of the latent image carrier in a main scanning direction which comprises: a deflector in which a movable member, which includes a deflection mirror surface which is shaped like an elongated strip which elongates in the main scanning direction, is integrated with a support member which supports the movable member in such a manner that the movable member can freely pivot about a pivot axis which is approximately orthogonal to the main scanning direction, the deflector driving the movable member to pivot about the pivot axis, thereby deflecting the light beam which is incident upon the deflection mirror surface; a light source emitting the light beam; a first optical system which shapes the light beam from the light source into an elongated cross sectional shape which elongates in the main scanning direction, and makes the light beam impinge upon the deflection mirror surface from a front side to the deflection mirror surface along a direction of the pivot axis at an acute angle with respect to a surface normal to the deflection mirror surface; and a second optical system which images the light beam deflected by the deflection mirror surface on the surface of the latent image carrier, wherein the optical scanning apparatus forms an electrostatic latent image on the latent image carrier.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 1 is a drawing which shows one embodiment of an image forming apparatus according to the present invention.

DETAILED DESCRIPTION OF THE PREFERRED EMBODIMENT

Figure 2:
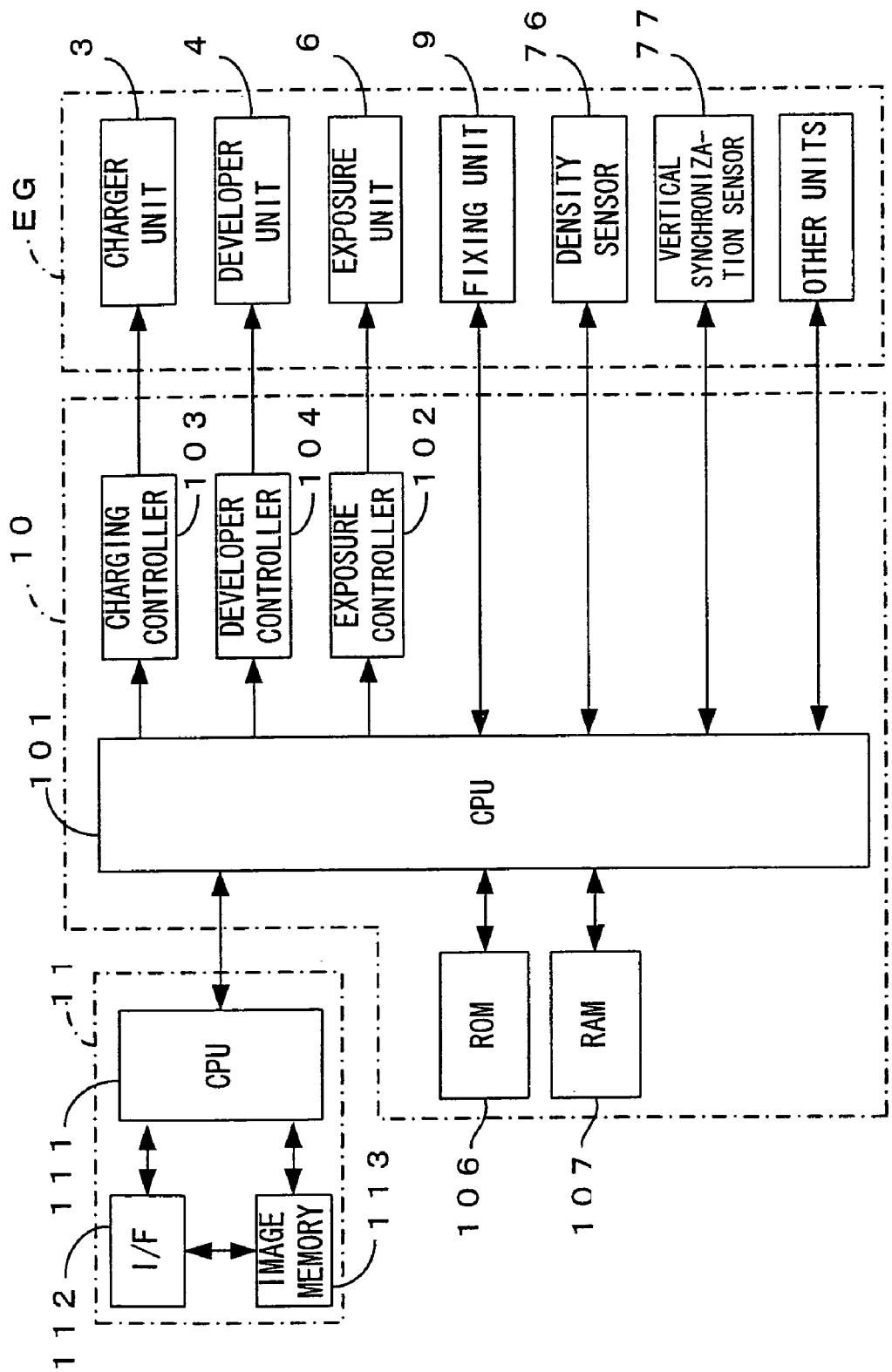
FIG. 2 is a block diagram which shows the electric structure of the image forming apparatus which is shown in FIG. 1.

FIG. 1 is a drawing which shows an embodiment of an image forming apparatus according to the present invention. FIG. 2 is a block diagram which shows the electric structure of the image forming apparatus which is shown in FIG. 1. This image forming apparatus is a color printer of the so-called 4-cycle type. In this image forming apparatus, when a print command is fed to a main controller 11 from an external apparatus such as a host computer in response to a user's image formation request, an engine controller 10 controls respective portions of an engine part EG in accordance with the print instruction received from the main controller 11 of a CPU 111, and an image which corresponds to the print instruction is formed on a sheet which may be a copy paper, a transfer paper, a plain paper or a transparency for an overhead projector.

In the engine part EG, a photosensitive member 2 is disposed so that the photosensitive member 2 can freely rotate in the arrow direction (sub scanning direction) shown in FIG. 1. Around the photosensitive member 2, a charger unit 3, a rotary developer unit 4 and a cleaner (not shown) are disposed along the direction in which the photosensitive member rotates. A charging controller 103 is electrically connected with the charger unit 3, for application of a predetermined charging bias upon the charger unit 3. The bias application uniformly charges an outer circumferential surface of the photosensitive member 2 to a predetermined surface potential. The photosensitive member 2, the charger unit 3 and the cleaner form one integrated photosensitive member cartridge which can be freely attached to and detached from a main body 5 as one integrated unit.

An exposure unit 6 emits a light beam L toward the outer circumferential surface of the photosensitive member 2 thus charged by the charger unit 3. The exposure unit 6 makes the light beam L scan on the photosensitive member 2 based on an electric signal from an exposure controller which will be described later, whereby an electrostatic image which reflects an image signal is formed. The exposure unit 6 is thus an optical scanning apparatus according to the present invention, and the structure and operations of the exposure unit will be described in detail later.

The developer unit 4 develops thus formed electrostatic latent image with toner. In other words, in this embodiment, the developer unit 4 comprises a support frame 40 which is axially disposed for free rotations, and also a yellow developer 4Y, a magenta developer 4M, a cyan developer 4C and a black developer 4K which house toner of the respective colors and are formed as cartridges which are freely attachable to and detachable from the support frame 40. The developer unit 4 is driven into rotations in response to a control command given from a developer controller 104 of the engine controller 10. When the developers 4Y, 4C, 4M and 4K are selectively positioned at a predetermined developing position which abuts on the photosensitive member 2 or is faced with the photosensitive member 2 over a predetermined gap, toner of the color corresponding to the selected developer is supplied onto the surface of the photosensitive member 2 by a developer roller 44 which carries the toner of the selected color. As a result, the electrostatic latent image on the photosensitive member 2 is visualized in the selected toner color.

A toner image developed by the developer unit 4 in the manner above is primarily transferred onto an intermediate transfer belt 71 of a transfer unit 7 in a primary transfer region TR1. The transfer unit 7 comprises the intermediate transfer belt 71 which runs across a plurality of rollers 72, 73, etc., and a driver (not shown) which drives the roller 73 into rotations to thereby rotate the intermediate transfer belt 71 in a predetermined rotation direction.

Further, there are a transfer belt cleaner (not shown), a density sensor 76 (FIG. 2) and a vertical synchronization sensor 77 (FIG. 2) in the vicinity of the roller 72. Of these, the density sensor 76 is disposed facing a surface of the intermediate transfer belt 71 and measures the optical density of a patch image formed on an outer circumferential surface of the intermediate transfer belt 71. Meanwhile, the vertical synchronization sensor 77 is a sensor which detects a reference position of the intermediate transfer belt 71, and serves as a vertical synchronization sensor for obtaining a synchronizing signal outputted in relation to rotations of the intermediate transfer belt 71 in the sub scanning direction, namely, a vertical synchronizing signal Vsync. In this apparatus, for the purpose of aligning the timing at which the respective portions operate and accurately overlaying toner images of the respective colors on top of each other, the respective portions of the apparatus operate under the control of the vertical synchronizing signal Vsync.

For transfer of color images on sheets, the toner images of the respective colors formed on the photosensitive member 2 are overlaid each other on the intermediate transfer belt 71, thereby forming color images which will then be secondarily transferred onto sheets taken out one by one from a cassette 8 and transported on a transportation path F to a secondary transfer region TR2.

At this stage, in order to properly transfer the images carried by the intermediate transfer belt 71 onto a sheet at a predetermined position, the timing of feeding the sheet to the secondary transfer region TR2 is controlled. To be specific, there is a gate roller 81 disposed in front of the secondary transfer region TR2 on the transportation path F, and as the gate roller 81 rotates in synchronization to the timing of rotations of the intermediate transfer belt 71, the sheet is fed into the secondary transfer region TR2 at predetermined timing.

Further, the sheet now bearing the color image is transported to a discharge tray part 51, which is disposed to a top surface portion of the main body 5, through a fixing unit 9 and a discharge roller 82. When images are to be formed on the both surfaces of a sheet, the discharge roller 82 moves the sheet seating an image on its one surface in the manner above in a switch back motion. The sheet is therefore transported along a reverse transportation path FR. While the sheet is returned back to the transportation path F again before arriving at the gate roller 81, the surface of the sheet which abuts on the intermediate transfer belt 71 in the secondary transfer region TR2 and is to receive a transferred image is, at this stage, the opposite surface to the surface which already bears the image. In this fashion, it is possible to form images on the both surfaces of the sheet.

In FIG. 2, denoted at 113 is an image memory disposed in the main controller 11 for storage of image data fed from an external apparatus such as a host computer via an interface 112. Denoted at 106 is a ROM which stores a computation program executed by a CPU 101, control data for control of the engine part EG, etc. Denoted at 107 is a RAM which temporarily stores a computation result derived by the CPU 101, other data, etc.

Figure 3:
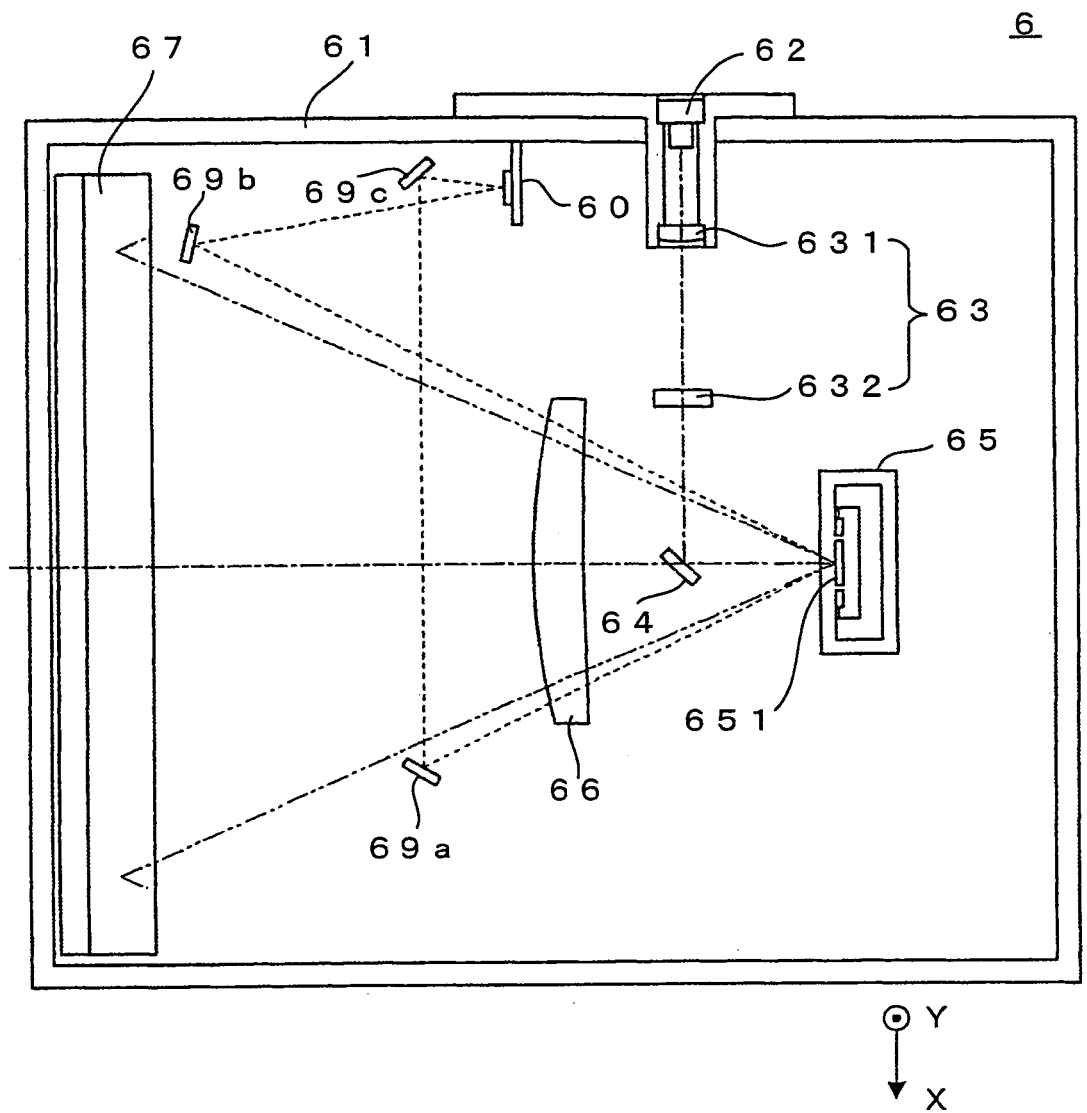
FIG. 3 is a main-scanning cross sectional view of an exposure unit which is disposed in the image forming apparatus which is shown in FIG. 1.
Figure 4:
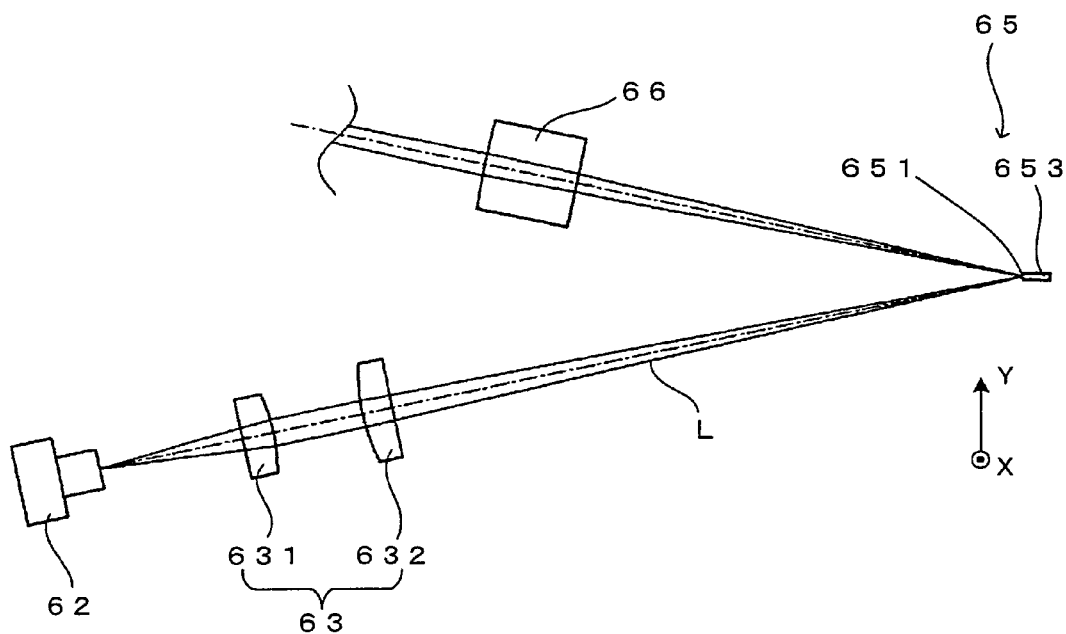
FIG. 4 is a sub-scanning cross sectional view of the exposure unit which is disposed in the image forming apparatus which is shown in FIG. 1.
Figure 5:
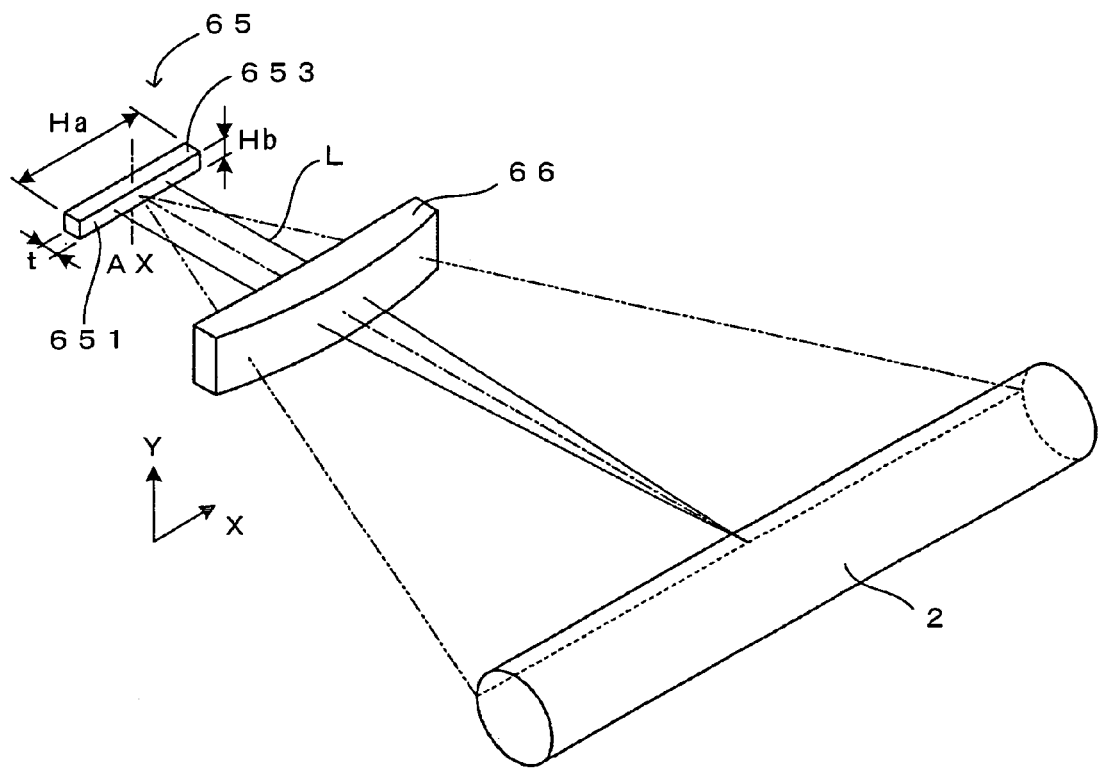
FIG. 5 is a perspective view which shows imaging of a deflection light beam.
Figure 6:
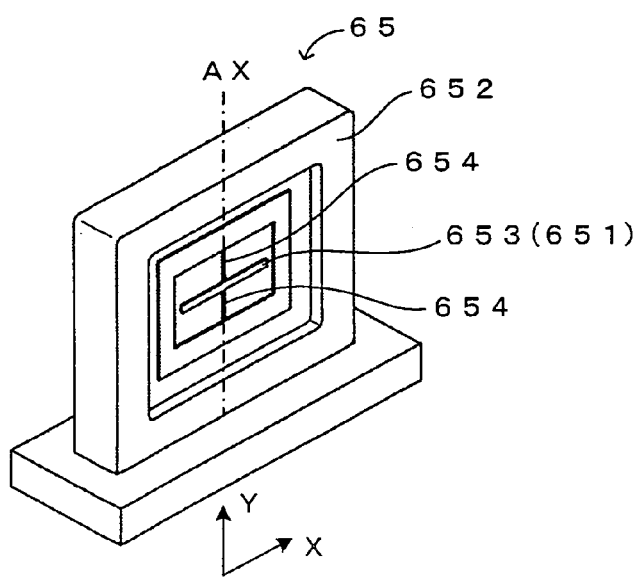
FIG. 6 is a drawing of a deflector which is one of components which form the exposure unit.
Figure 7:
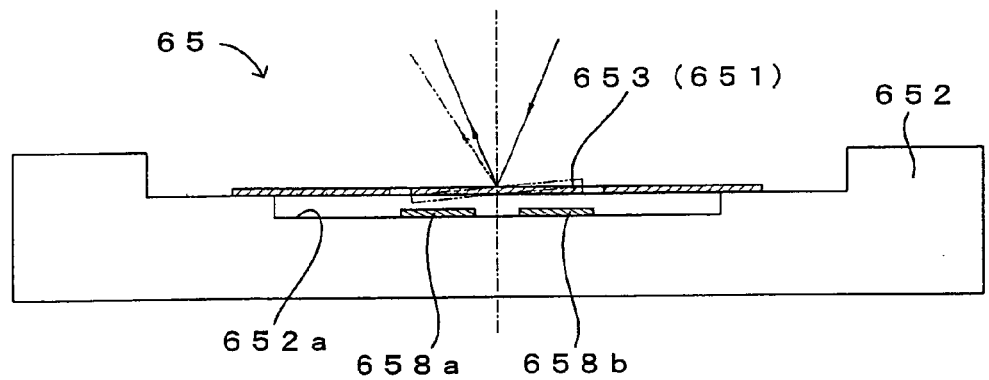
FIG. 7 is a drawing of the deflector which is one of components which form the exposure unit.
Figure 8:
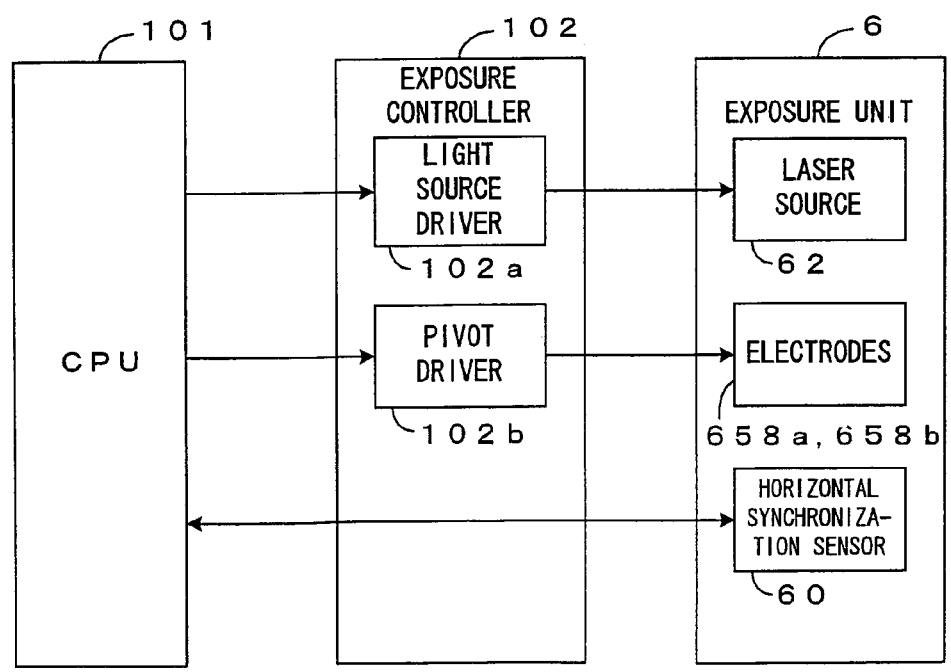
FIG. 8 is a block diagram which shows the structures of the exposure unit and an exposure controller.

FIG. 3 is a main-scanning cross sectional view showing the structure of the exposure unit which is disposed in the image forming apparatus which is shown in FIG. 1. FIG. 4 is a sub-scanning cross sectional view of the exposure unit. FIG. 5 is a perspective view which shows imaging of a scanning light beam. FIGS. 6 and 7 are drawings of a deflector which is one of components which form the exposure unit. FIG. 8 is a block diagram which shows the structures of the exposure unit and the exposure controller. The structure and operations of the exposure unit 6 will now be described in detail with reference to these drawings.

The exposure unit 6 comprises an exposure housing 61. A single laser source 62 is fixed to the exposure housing 61, permitting emission of a light beam from the laser source 62. The laser source 62 is electrically connected with a light source driver 102a of an exposure controller 102 as shown in FIG. 8. Hence, the light source driver 102a controls ON and OFF of the laser source 62 in accordance with image data, and the laser source 62 emits a light beam modulated in accordance with the image data. The laser source 62 thus functions as the "light source" of the present invention.

Further, to make the light beam from the laser source 62 scan and expose the surface of the photosensitive member 2 (surface-to-be-scanned), a collimator lens 631, a cylindrical lens 632, a mirror 64, a deflector 65, a scanning lens 66 and a return mirror 67 are disposed inside the exposure housing 61. In other words, after shaped into collimated light of a proper size by the collimator lens 631, the light beam from the laser source 62 impinges upon the cylindrical lens 632 which has power only in a sub scanning direction Y. This collimated light is then converged only in the sub scanning direction Y and imaged in the shape of a line in the vicinity of a deflection mirror surface 651 of the deflector 65. In this embodiment, the collimator lens 631 and the cylindrical lens 632 thus function as a first optical system 63 which shapes the light beam from the laser source 62 into an elongated cross sectional shape which is long in a main scanning direction X and makes the light beam impinge upon the deflection mirror surface 651.

The deflector 65 is made using a micro machining technique which is an application of semiconductor manufacturing techniques and which aims at forming an integrated micro machine on a semiconductor substrate, and therefore, the deflector 65 is capable of deflecting a light beam reflected by the deflection mirror surface 651 in the main scanning direction X. To be more specific, the deflector 65 has the following structure.

As shown in FIGS. 6 and 7, in the deflector 65, a single crystal substrate of silicon (hereinafter referred to merely as a "silicon substrate") 652 functions as the "support member" of the present invention, and a movable plate 653 is obtained by partially processing the silicon substrate 652. The movable plate 653 is elastically supported to the silicon substrate 652 by torsion springs 654 and capable of freely pivoting about the pivot axis AX which elongates in the sub scanning direction Y which is approximately orthogonal to the main scanning direction X. Further, in a central portion of the movable plate 653, an aluminum film or the like is disposed as the deflection mirror surface 651. In this embodiment, the movable plate 653 is finished in the shape of an elongated strip which extends in the main scanning direction X as shown in FIG. 6 such that the width Hb of the movable plate 653 along the direction of the pivot axis (sub scanning direction) satisfies the inequality below:

$$Mb + 1.5\ Ds < Hb < Mb + 1.5\ Ds + 2t \quad \text{(Condition 1)}$$

where $Mb = Ha \cdot \sin\theta \cdot \tan\gamma$. This will be described in detail later.

In addition, a recess 652a is formed in an approximately central portion of the silicon substrate 652, as shown in FIG. 7, so that the movable plate 653 can pivot around the pivot axis AX. In the inner bottom surface of the recess 652a, electrodes 658a and 658b are fixed at locations opposed against the both ends of the movable plate 653 (FIG. 7). These two electrodes 658a and 658b function as electrodes which are for driving the movable plate 653 into the pivoting action about the pivot axis AX. In short, the electrodes 658a and 658b are electrically connected with a pivot driver 102b of the exposure controller 102, and when a voltage is applied to the electrode, electrostatic adsorption force acts between the electrode and the deflection mirror surface 651 so that one edge portion of the deflection mirror surface 651 is pulled toward the electrode. Hence, alternate application of a predetermined voltage from the pivot driver 102b upon the electrodes 658a and 658b vibrates the deflection mirror surface 651 reciprocally about the pivot axis AX which are the torsion springs 654. When the drive frequency for obtaining the reciprocal vibrations is set to the resonance frequency of the deflection mirror surface 651, the deflection mirror surface 651 vibrates at a large amplitude and the edge portions of the deflection mirror surface 651 consequently get displaced to positions which are in the vicinity of the electrodes 658a and 658b. Further, as the edge portions of the deflection mirror surface 651 reach the positions close to the electrodes 658a and 658b owing to resonance, the electrodes 658a and 658b contributes to driving of the deflection mirror surface 651, and the edge portions of the deflection mirror surface 651 and the both electrodes disposed on a flat surface accordingly make it possible to more stably maintain the vibrations.

Although the foregoing has described that electrostatic adsorption force reciprocally vibrates the deflection mirror surface 651 according to this embodiment, electromagnetic force may be used to vibrate the deflection mirror surface 651. Driving of the deflection mirror surface 651 by means of electromagnetic force is already a well known technique, and hence, will not be described here.

The exposure unit 6 will be further described, referring back to FIGS. 3 and 4. The scanning light beam which is made scan by the deflector 65 as described above is emitted from the deflector 65 toward the photosensitive member 2, and this scanning light beam is imaged on the photosensitive member 2 via the scanning lens 66 and the return mirror 67 which correspond to the "second optical system" of the present invention, and a spot of the light beam is consequently formed on the surface of the photosensitive member. The scanning light beam in this manner scans parallel to the main scanning direction X and a line-like latent image which elongates in the main scanning direction X is formed at a scan position 21 on the photosensitive member 2 as shown in FIG. 5.

In this embodiment, at the start or end of the scanning light beam, return mirrors 69a through 69c guide the scanning light beam from the deflector 65 to the synchronization sensor 60 as shown in FIG. 3. In short, in this embodiment, the synchronization sensor 60 functions as a horizontal synchronization reading sensor which is for obtaining a synchronizing signal in the main scanning direction X, namely, a horizontal synchronizing signal.

Figure 9:
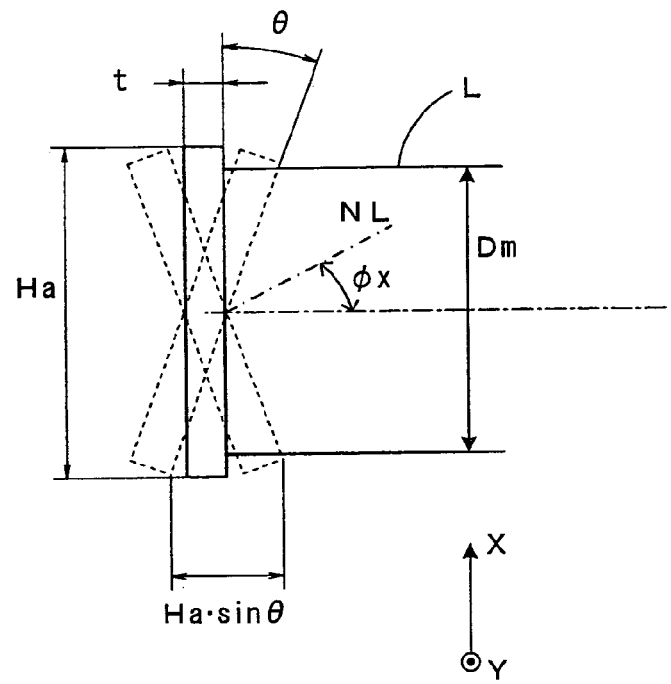
FIG. 9 is a main-scanning cross sectional view which shows the relation between a movable plate and a light beam.
Figure 10:
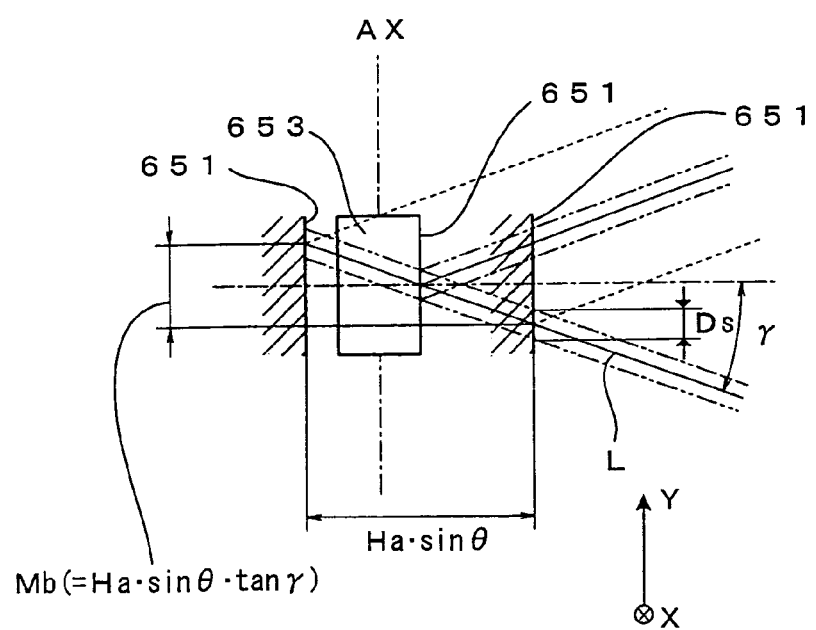
FIG. 10 is a sub-scanning cross sectional view which shows the relation between the movable plate and the light beam.
Figure 11:
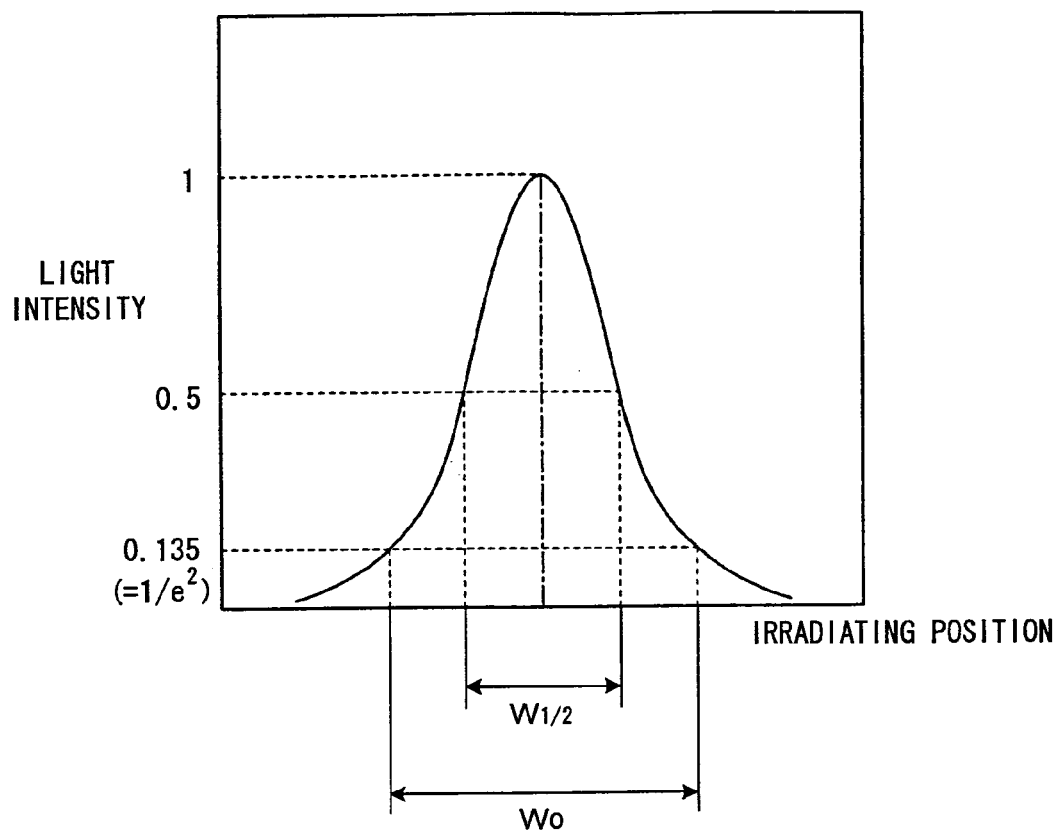
FIG. 11 is a graph which shows intensity distribution of the light beam.

The structure of the movable plate 653 will now be described with reference to FIGS. 9 through 11. FIG. 9 is a main-scanning cross sectional view illustrating the relationship between the movable plate and a light beam. FIG. 10 is a sub-scanning cross sectional view illustrating the relationship between the movable plate and a light beam. This embodiment requires setting the length Ha of the deflection mirror surface 651 of the movable plate 653 in the main scanning direction X and the width Hb of the deflection mirror surface 651 of the movable plate 653 in the sub scanning direction Y as described below in accordance with the print resolution.

First, the length Ha will be described. The intensity distribution of the light beam from the laser source 62 is usually a Gaussian distribution as that shown in FIG. 11, and the diameter of a spot of the light beam on the surface of the photosensitive member (surface-to-be-scanned) is set so that a pixel pitch is equal to a spot diameter at which the intensity distributed as such becomes approximately 0.5 of a peak intensity value. Hence, the diameter of a spot on the surface of the photosensitive member (at which the intensity distribution is $1/e^2$) w0 is calculated from the print resolution N as follows:

$$w0=1.7\times(25.4/N)$$

Meanwhile, the beam diameter $(1/e^2)$ Dm on the deflection mirror surface 651 in the main scanning direction X is calculated based on the characteristic of a Gaussian beam by the following formula:

$$Dm = w0\left\{1+\left(\frac{4\lambda f}{\pi w0^2}\right)^2\right\}^{1/2}$$

where the symbol $\lambda$ denotes the wavelength of the laser and the symbol f denotes the focal distance of the scanning lens 66.

Considering a margin of 1.5 times, the length Ha of the movable plate 653 is set as below in this embodiment:

$$Ha \geq 1.5\ Dm \qquad \text{(Condition 2)}$$

The width Hb will be described next. In this embodiment, since the light beam L is incident from the front side to the deflection mirror surface 651 and from the direction of the pivot axis (from below in FIG. 10) at an acute angle $\gamma$ with respect to the surface normal NL to the deflection mirror surface 651 as shown in FIG. 10, the position of incidence of the light beam L on the deflection mirror surface 651 gets displaced along the direction of the pivot axis (sub scanning direction Y) as the deflection mirror surface 651 pivots. The maximum displacement Mb is expressed as below, as FIGS. 9 and 10 clearly show:

$$Mb = Ha \cdot \sin\theta \cdot \tan\gamma$$

While the first optical system 63 converges the light beam L in the sub scanning direction Y, it is necessary that the width Hb of the movable plate 653 in the sub scanning direction Y is wide to a certain extent or wider in order to prevent the light beam L impinging upon the deflection mirror surface 651 from spreading outside the deflection mirror surface 651 in the sub scanning direction Y In other words, the width Hb must satisfy the inequality below:

$$Mb+1.5\ Ds < Hb$$

where the symbol Ds denotes the beam diameter on the deflection mirror surface 651 in the sub scanning direction Y.

While the movable plate 653 needs be light-weight so as to pivot at a high speed and the left-hand side of the inequality above expresses the minimum width of the movable plate 653 in the sub scanning direction Y, since manufacturing of the deflector 65 using a micro machining technique necessitates use of an etching technique, etc., an influence of chipping or the like of the deflection mirror surface 651 needs be considered. In short, while the movable plate 653 is being formed by etching, the movable plate 653 gets chipped at its edge as the etching proceeds and the size of the chipping is approximately proportional to the thickness of the movable plate 653. Hence, it would be sufficient to ensure a design margin of the thickness t of the movable plate 653 at the both ends of the deflection mirror surface 651 in the sub scanning direction Y. Therefore, it is preferable that the width Hb of the movable plate 653 in the sub scanning direction Y satisfies the inequality below:

$$Hb > Mb + 1.5\ Ds + 2t$$

Noting this, this embodiment requires finishing the movable plate 653 into a shape which satisfies the conditions 1 and 2 described earlier, namely, the shape of an elongated strip which is long in the main scanning direction X. This realizes secure deflection of the light beam by the deflection mirror surface 651 and a faster speed of the deflection. To be more specific, the deflector 65 as described below may be used in image forming apparatuses which have the following design requirements (Example 1 and Example 2). The examples below however do not limit the present invention in any manner. The present invention may of course be implemented with appropriate modification to an extent not deviating from the intention of the invention, and any such modification is within the scope of the invention.

EXAMPLE 1

In the event that an image forming apparatus is designed under design requirements of:
the print resolution N=600 dpi;
the focal distance of the scanning lens 66=290 mm;
the wavelength λ of the laser=650 nm;
the thickness t of the movable plate 653=0.1 mm;
the maximum pivot angle θ of the deflection mirror surface 651=±20°;
the angle of incidence γ of the light beam with respect to the deflection mirror surface 651=5°; and
the beam diameter on the deflection mirror surface 651 in the sub scanning direction=100 μm, the respective components calculated from these design requirements are:
the spot diameter w0 on the surface of the photosensitive member=72 μm; and
the beam diameter Dm on the deflection mirror surface 651 in the main scanning direction=3.3 mm.

Since the "Condition 2" therefore becomes as described below, the length Ha of the movable plate 653 is set to 5 (mm) in Example 1:

$Ha \geq 1.5\ Dm=4.95$ (mm)

Meanwhile, because of this movable plate 653, the maximum displacement Mb of the light beam L on the deflection mirror surface 651 is:

$Mb=Ha \cdot \sin\theta \cdot \tan\gamma=0.15$ (mm)

Since the "Condition 1" consequently becomes as described below, the width Hb of the movable plate 653 is set to 0.4 (mm) in Example 1:

$0.3 < Hb < 0.5$

The exposure unit 6 was fabricated using the deflector 65 designed as such, and it was possible for the light beam L to scan on the surface of the photosensitive member 2 stably at a high speed.

EXAMPLE 2

In the event that an image forming apparatus is designed under design requirements of:
the print resolution N=1200 dpi;
the focal distance of the scanning lens 66=290 mm;
the wavelength λ of the laser=650 nm;
the thickness t of the movable plate 653=0.3 mm;
the maximum pivot angle θ of the deflection mirror surface 651=±20°;
the angle of incidence γ of the light beam with respect to the deflection mirror surface 651=5°; and
the beam diameter on the deflection mirror surface 651 in the sub scanning direction=70 μm, the respective components calculated from these design requirements are:
the spot diameter w0 on the surface of the photosensitive member=36 μm; and
the beam diameter Dm on the deflection mirror surface 651 in the main scanning direction=6.6 mm.

Since the "Condition 2" therefore becomes as described below, the length Ha of the movable plate 653 is set to 10 (mm) in Example 2:

$Ha \geq 1.5\ Dm=9.9$ (mm)

Meanwhile, because of this movable plate 653, the maximum displacement Mb of the light beam on the deflection mirror surface 651 is:

$Mb=Ha \cdot \sin\theta \cdot \tan\gamma=0.3$ (mm)

Since the "Condition 1" consequently becomes as described below, the width Hb of the movable plate 653 is set to 0.7 (mm) in Example 2:

$0.405 < Hb < 1.005$

The exposure unit 6 was fabricated using the deflector 65 designed as such, and it was possible for the light beam to scan on the surface of the photosensitive member 2 stably at a high speed.

As described above, in this embodiment, the light beam L from the laser source 62 scans in the main scanning direction X while impinging upon the deflection mirror surface 651 from the front side to the deflection mirror surface 651 and from the direction of the pivot axis (the sub scanning direction Y) at the acute angle γ with respect to the surface normal NL to the deflection mirror surface 651. Since the light beam L is incident upon the deflector 65 from the front side to the deflection mirror surface 651 in this embodiment, when the pivot angle of the deflection mirror surface 651 is zero, the angle of incidence of the light beam with respect to the deflection mirror surface 651 within the main scanning surface is zero. As the pivot angle θ of the deflection mirror surface 651 grows, while the angle of incidence φx of the incident light beam L with respect to the deflection mirror surface 651 grows and the angle (=90°−φx) at which the deflection mirror surface 651 slices the incident light beam L within the main scanning surface (the plane of FIG. 9) accordingly becomes acute as shown in FIG. 9 for instance, this angle is still larger than that in the conventional apparatus. Hence, the size of the deflection mirror surface 651 in the main scanning direction X necessary for covering a predetermined range of scanning is smaller than that in the conventional apparatus, which in turn allows that the length Ha of the movable member 653 in the main scanning direction X is relatively short. Further, the first optical system 63 shapes the light beam L incident upon the deflection mirror surface 651 into an elongated cross sectional shape which is long in the main scanning direction X, and the movable member 653 is finished as an elongated strip which elongates in the main scanning direction X. In other words, the width Hb of the movable plate 653 in the direction of the pivot axis (the sub scanning direction Y) which is approximately orthogonal to the main scanning direction X is remarkably narrow. The movable plate 653 is thus light-weight and can pivot stably at a faster speed than in the conventional apparatus within the exposure unit 6 having such a structure. This allows that the light beam L scans on the surface of the photosensitive member 2 stably at a high speed and a latent image is formed in a stable manner.

The present invention is not limited to the embodiment above, but may be modified in various manners in addition to the preferred embodiments above, to the extent not deviating from the object of the invention. For instance, although the embodiment above requires that the light beam L impinges upon the deflection mirror surface 651 from below along the direction of the pivot axis, the light beam L may impinge from above along the direction of the pivot axis.

Although the optical scanning apparatus according to the present invention is used as an exposure unit of a color image forming apparatus, the present invention is not limited to this. In other words, the optical scanning apparatus according to the present invention may be used as an exposure unit of an image forming apparatus in which a light beam scans on a latent image carrier such as a photosensitive member to thereby form an electrostatic latent image, the electrostatic latent image is developed with toner and a toner image is formed. Of course, the application of the optical scanning apparatus is not limited to an exposure unit which is disposed to an image forming apparatus, but generally includes any optical scanning apparatus which makes a light beam scan on a surface-to-be-scanned.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An optical scanning apparatus which makes a light beam scan on a surface-to-be-scanned in a main scanning direction, comprising:
    a deflector in which a movable member, which includes a deflection mirror surface which is shaped like an elongated strip which elongates in said main scanning direction, is integrated with a support member which supports said movable member in such a manner that said movable member can freely pivot about a pivot axis which is approximately orthogonal to said main scanning direction, said deflector driving said movable member to pivot about said pivot axis, thereby deflecting said light beam which is incident upon said deflection mirror surface;
    a light source emitting said light beam;
    a first optical system which shapes said light beam from said light source into an elongated cross sectional shape which elongates in said main scanning direction, and makes said light beam impinge upon said deflection mirror surface from a front side to said deflection mirror surface along a direction of said pivot axis at an acute angle with respect to a surface normal to said deflection mirror surface; and
    a second optical system which images said light beam deflected by said deflection mirror surface on said surface-to-be-scanned,
    wherein said movable member is formed so that a width Hb of said movable member in the direction of said pivot axis satisfies a relationship:

$Mb+1.5\ Ds < Hb < Mb+1.5\ Ds+2t,$ where Mb is a maximum displacement of said light beam on said deflection mirror surface in the direction of said pivot axis, Ds is a beam diameter on said deflection mirror surface in the direction of said pivot axis, and t is a thickness of said movable member, and
    wherein said movable member is formed so that a length Ha of the movable member satisfies a relationship:

$Ha \geq 1.5\ Dm,$ where Dm is the beam diameter on said deflection mirror surface in a main scanning direction.

2. An image forming apparatus, comprising:
    a latent image carrier, and
    an optical scanning apparatus which makes a light beam scan on a surface of said latent image carrier in a main scanning direction which comprises:
    a deflector in which a movable member, which includes a deflection mirror surface which is shaped like an elongated strip which elongates in said main scanning direction, is integrated with a support member which supports said movable member in such a manner that said movable member can freely pivot about a pivot axis which is approximately orthogonal to said main scanning direction, said deflector driving said movable member to pivot about said pivot axis, thereby deflecting said light beam which is incident upon said deflection mirror surface;
    a light source emitting said light beam;
    a first optical system which shapes said light beam from said light source into an elongated cross sectional shape which elongates in said main scanning direction, and makes said light beam impinge upon said deflection mirror surface from a front side to said deflection mirror surface along a direction of said pivot axis at an acute angle with respect to a surface normal to said deflection mirror surface; and
    a second optical system which images said light beam deflected by said deflection mirror surface on said surface of said latent image carrier, wherein said optical scanning apparatus forms an electrostatic latent image on said latent image carrier,
    wherein said movable member is formed so that a width Hb of said movable member in the direction of said pivot axis satisfies a relationship:

$Mb+1.5\ Ds < Hb < Mb+1.5\ Ds+2t,$ where Mb is a maximum displacement of said light beam on said deflection mirror surface in the direction of said pivot axis, Ds is a beam diameter on said deflection mirror surface in the direction of said pivot axis, and t is a thickness of said movable member, and
    wherein said movable member is formed so that a length Ha of the movable member satisfies a relationship:

$Ha \geq 1.5\ Dm,$ where Dm is the beam diameter on said deflection mirror surface in a main scanning direction.

* * * * *